United States Patent
Heuner et al.

[11] 3,809,458
[45] May 7, 1974

[54] LIQUID CRYSTAL DISPLAY

[75] Inventors: Robert Charles Heuner, Bound Brook; Stanley Joseph Niemiec, Somerville, both of N.J.

[73] Assignee: RCA Corporation, Princeton, N.J.

[22] Filed: May 25, 1972

[21] Appl. No.: 256,717

[52] U.S. Cl............... 350/160 LC, 340/166 EL
[51] Int. Cl............................... G02f 3/16
[58] Field of Search ......... 340/166 EL; 350/160 LC

[56] References Cited
UNITED STATES PATENTS
3,740,717   6/1973   Heuner et al................. 340/166 EL Primary Examiner—Edward S. Bauer
Attorney, Agent, or Firm—H. Christoffersen; Samuel Cohen

[57] ABSTRACT

Multiplexed operation of a plurality of liquid crystal indicators is achieved with alternating, unipolarity, symmetrical exciting voltages and alternating, unipolarity, asymmetrical erase voltages. The average direct voltage level across any liquid crystal element in the erased condition is zero and the direct voltage level across that element during each half period of the exciting voltage is never greater than a fraction less than one-half of the unipolarity exciting or erase voltage amplitude.

17 Claims, 6 Drawing Figures

LEGEND: ⟩⊃− = "EXCLUSIVE OR" GATE

Fig. 3

LEGEND:
⊠ = LIQUID CRYSTAL

LIQUID CRYSTAL DISPLAY

BACKGROUND OF THE INVENTION

Wide interest has been shown in recent years in the use of liquid crystal, such as that of the nematic type operating on the principle of dynamic scattering, for display purposes such as television type displays, bar graphs, numeric indicators and so on. It is now well understood in the art that in these and other applications the life of the liquid crystal is greatly increased when the voltages employed for excitation and erasure are alternating voltages and the resulting average value of direct current through the liquid crystal is zero.

In many applications the only voltage conveniently available for driving the liquid crystal is either a direct voltage or a unipolarity alternating voltage, that is, one which varies in value between say zero and some positive level or zero and some negative level. Put another way, in many situations the alternating voltage which is available has a direct current component other than zero and this direct current adversely affects the life of the liquid crystal. Typical examples of environments of this type occur in timing systems which employ logic circuits as, for example, in portable calculators, wrist watches and so on. In these types of systems, the primary power supply may be a battery and the alternating voltage produced by the logic circuits may vary in amplitude between a level such as ground, representing binary zero, and a level such as +15 volts representing binary 1, as one example.

In systems such as discussed briefly above, there are also space and wiring problems as well as logic circuit complexity problems. With respect to space and wiring, the liquid crystal numeric indicators, for example, occupy only a relatively small volume and there is difficulty connecting the leads from the various segments to the logic circuits. Here it would be desirable, if possible, to reduce to a minimum the number of leads coming from the liquid crystal indicators. With respect to logic circuits, it is desirable that they be relatively simple and that, if possible, the ones required to drive a single indicator be suitable, without duplication, for also driving the remaining indicators.

One solution to the problem above is discussed in copending application Ser. No. 208,813, filed Dec. 16, 1971 by the present inventors and D. K. Morgan and assigned to the same assignee as the present application, and now U.S. Pat. No. 3,740,717. In the multiplexing arrangement of that application, the direct voltage component across a liquid crystal element in the erased condition or in the excited condition, averaged over one period of the exciting voltage, is substantially zero volts. The average direct voltage level across a liquid crystal element in the erased condition during one-half period of the exciting voltage, is one-half the maximum amplitude of the erase voltage and this is lower than the voltage threshold for light scattering for the liquid crystal. The more that this direct voltage component can be reduced, the less the likelihood that a liquid crystal element intended to be in the erased condition will be driven into the faintly light scattering condition.

SUMMARY OF THE INVENTION

In the arrangement of the present invention, the direct voltage across a liquid crystal element averaged over a period of the exciting voltage also is zero volts. However, during the period a liquid crystal element is in the erased condition, the maximum direct voltage level across the liquid crystal during each half period of the exciting voltage is less than one-half of the maximum amplitude of the erase voltage. Operation in this way may be achieved by employing an asymmetrical, unipolarity erase voltage which is applied to the liquid crystal elements in the way discussed in detail below.

DETAILED DESCRIPTION

Figure 1:
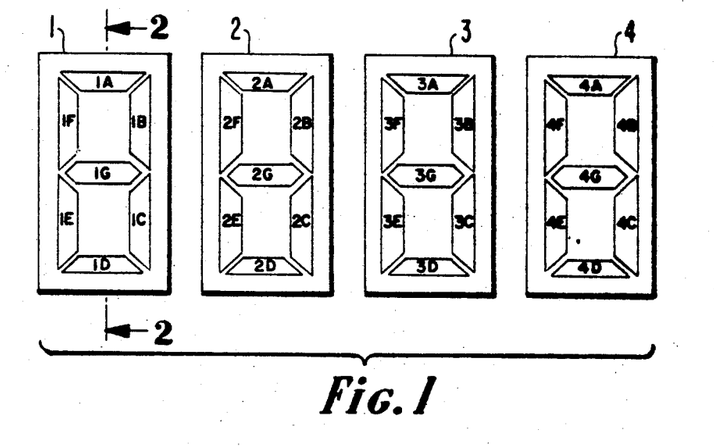
FIG. 1 is a plan view of a liquid crystal display panel containing four numeric indicators.
Figure 2:
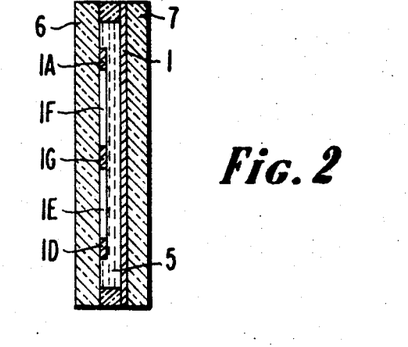
FIG. 2 is a cross section through one of the indicators.

FIG. 1 illustrates a four digit numeric indicator panel useful, for example, for watches, calculators and the like. Each indicator includes seven segments such as 1A, 1B, 1C, 1D, 1E, 1F and 1G and each also includes a backplate, such as 1. Liquid crystal 5, shown in the cross-section of FIG. 2, is located between the seven segments on the one hand and the backplate on the other hand. The liquid crystal preferably is of the nematic type which operates on the principle of dynamic scattering and it is switchable from a first optical state to a second optical state. In the example chosen by way of illustration, that is, a nematic liquid crystal operating on the principle of dynamic scattering, in one optical state, that is, when the liquid crystal receives no exciting voltage or when it receives an exciting voltage of an amplitude lower than a certain threshold level, the liquid crystal is relatively clear and in its other state, that is, when it receives an exciting voltage of an amplitude greater than its threshold level, it changes to a light scattering condition. The seven segments are formed of transparent conductors and the backplate, in the case of a transmission type indicator, is also formed of a transparent conductor but in the case of a reflecting type indicator, is formed of reflecting conducting material.

The seven segments of an indicator are located on the inner surface of a transparent element such as glass plate 6. Similarly, the backplate is located on the inner surface of a glass plate such as 7. The thickness of the liquid crystal layer is a matter of engineering design and is one factor (there are also others) which determines, among other things, the amplitude of the exciting voltage required for causing the liquid crystal to scatter light.

In an arrangement of the type shown in FIGS. 1 and 2, in the interest of being able to simplify the logic and to reduce the number of drive circuits and the number of leads extending from the panel to the circuits for driving the segments, it is desirable to excite only one indicator at a time. If the indicator is placed in the on condition for a sufficient interval of time and this excitation recurs at a sufficiently high rate, the normal relaxation time of the material and the persistence of vision are such that the indicator will appear to remain on (the liquid crystal will appear to remain in its light scattering condition) in between excitation intervals.

Figure 3:
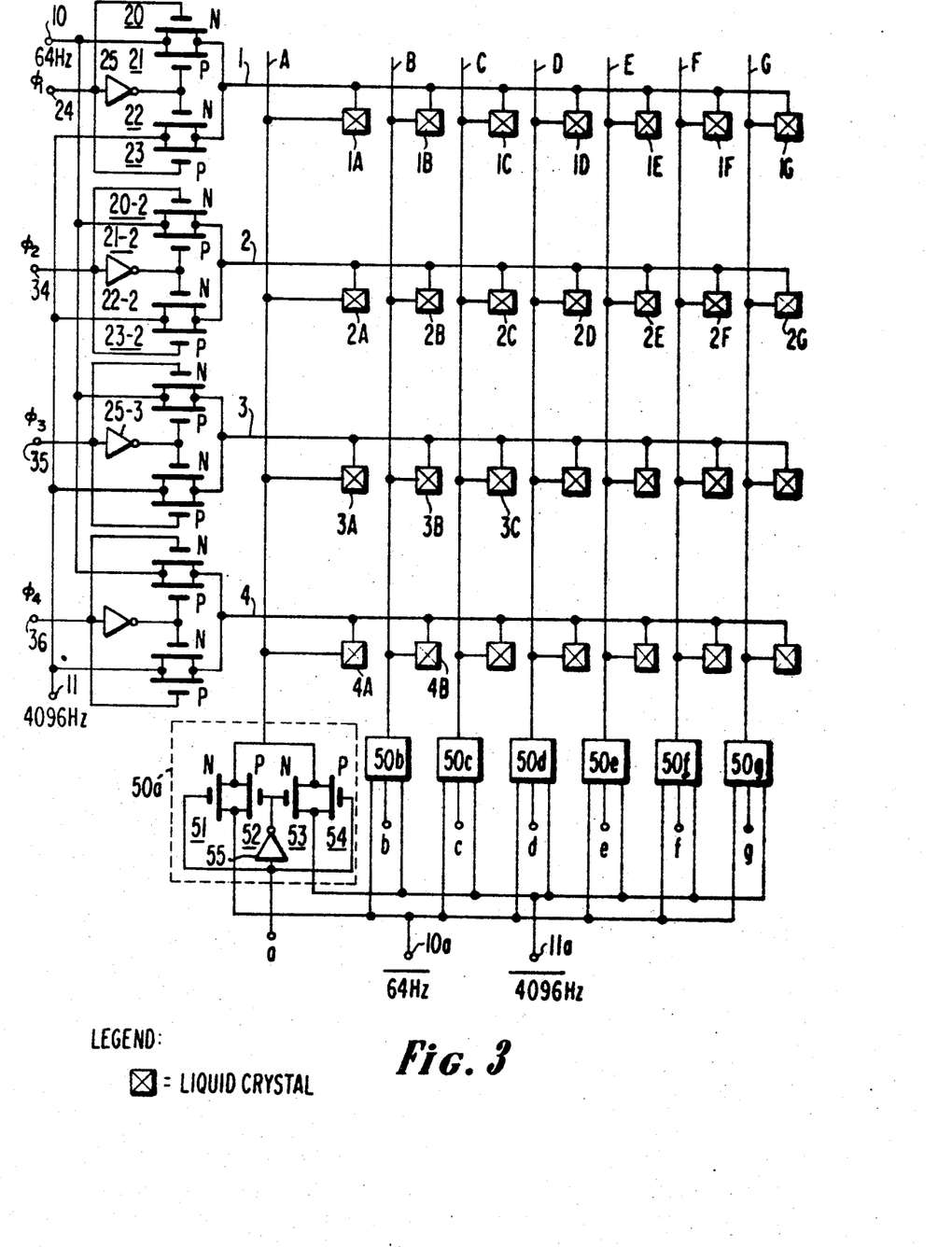
FIG. 3 is a schematic drawing showing how the four indicators of FIG. 1 may be interconnected in a matrix in accordance with the teachings of the present invention.

FIG. 3 shows how the segments may be interconnected to achieve the results above. Each row of the matrix shown consists of one of the indicators. The row conductors correspond to the four backplates 1 through 4 and are similarly legended. The A segments of all four indicators are connected to a common conductor, the A column conductor of FIG. 3. Similarly, the B segments are connected to a common conductor — the B column conductor, the C segments to the C conductor and so on. The liquid crystal elements at the intersections of the rows and columns are identified by the row and column numbers. For example, the elements in row 1 are 1A, 1B, 1C and so on and the elements in column 1 are 1A, 2A, 3A and so on, all corresponding to like legended elements of FIG. 1. Each element consists of a volume of liquid between a segment and the backplate and its equivalent circuit would be a relatively high value of resistance, and a relatively low value of capacitance associated with the resistance.

A group of two dual transmission gates connects to each row of the array. As the groups are identical, only the group for row 1 will be described. Each dual transmission gate consists of an $n$-type metal-oxide-semiconductor (MOS) transistor such as 20 and a $p$-type MOS transistor such as 21. The gate electrode of the $n$-type transistor 20 and of the $p$-type transistor 23 are connected to terminal 24. A character select signal $\phi_1$ is applied to this terminal. This character select signal is also applied via logical inverter 25 to the gate electrodes of $p$-type MOS transistor 21 and $n$-type MOS transistor 22.

A 64 Hz unipolarity exciting voltage which varies in amplitude between two levels such as zero volts representing binary 0 and +15 volts representing binary 1 is applied to terminal 10. This terminal connects to one end of the parallel connected transmission paths of $n$-type transistor 20 and $p$-type transistor 21. A 4,096 Hz unipolarity, asymmetrical erase voltage which also varies in amplitude from 0 to 15 volts is applied to one end of the parallel connected transmission paths of $n$-type MOS transistor 22 and $p$-type MOS transistor 23. The other end of these parallel connected transmission paths is connected to row 1. Similarly, the corresponding end of the parallel connected transmission paths of transistors 20 and 21 is connected to row 1.

As mentioned above, the $\phi_1$ character select voltage is applied to terminal 24. This selects the first numeric indicator (the row 1 indicator). The $\phi_2$ character select voltage is applied to terminal 34 for selecting the second indicator, that is, the indicator of row 2 and similarly the $\phi_3$ and $\phi_4$ character select voltages are applied to terminals 35 and 36 for selecting rows 3 and 4, respectively.

A group of two dual transmission gates connects to each column of the array. As the groups are identical, only the group 50a which is connected to column A is illustrated schematically. This gate receives the control voltage $a$ and the other gates receive the control voltages $b$ through $g$. Each control voltage is a direct voltage level which may have one of two values representing 1 and 0 respectively. For example, a level of +15 volts may represent a 1 and zero volts a 0.

A 64 Hz unipolarity exciting voltage is applied to terminal 10a. This voltage, legended $\overline{64\ Hz}$, is complementary to the voltage applied to terminal 10. The terminal 10a connects to one end of the parallel connected transmission paths of $n$-type transistor 51 and $p$-type transistor 52. A 4,096 Hz unipolarity erase voltage which is complementary to the erase voltage at terminal 11 is applied to terminal 11a. Terminal 11a connects to one end of the parallel connected transmission paths of $n$-type transistor 53 and $p$-type transistor 54. The control voltage $a$ is applied directly to the gate electrodes of transistors 51 and 54 and through inverter 55 to the gate electrodes of transistors 52 and 53.

Figure 4:
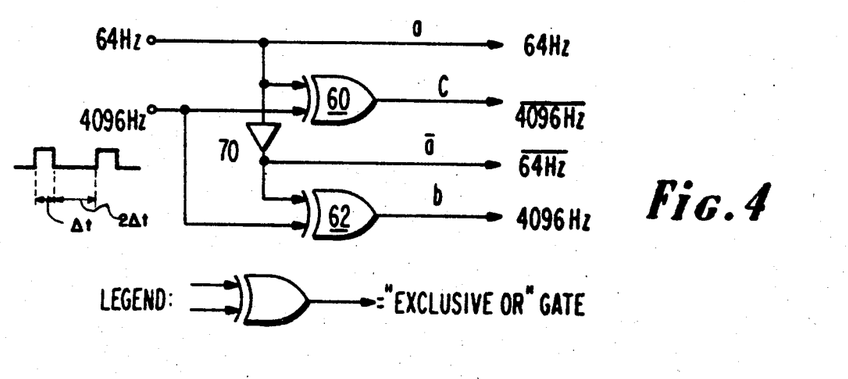
FIG. 4 is a logic diagram showing how the erase and exciting voltages for the circuit of FIG. 3 may be obtained.
Figure 5:
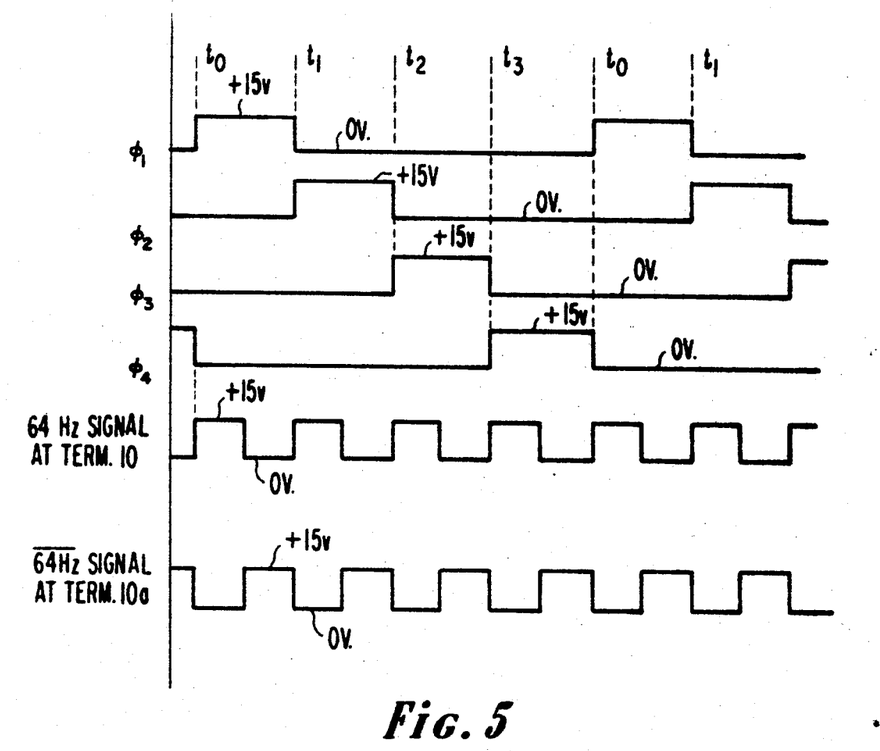
FIGS. 5 and 6 are drawings of waveforms to help explain the operation of the matrix of FIG. 3.

The $\phi_1$ through $\phi_4$ voltages and the 64 Hz and $\overline{64\ Hz}$ signals are shown in FIG. 5. The 4,096 Hz and $\overline{4,096\ Hz}$ signals are shown at $b$ and $c$ in FIG. 6. Note that each of these signals changes to its complementary form each half cycle of the 64 Hz exciting voltage. Thus, for example, during the positive-going half cycle of the 64 Hz signal, that is, the period $t_0$-$t_1$, the 4,096 Hz signal illustrated at $b$ is of one shape, and during the following half cycle of the 64 Hz signal, that is, during the period $t_1$-$t_2$ the 4,096 Hz signal illustrated at $b$ has a shape complementary to that during the period $t_0$-$t_1$. The circuit for producing this wave is illustrated in FIG. 4, and discussed shortly.

Figure 6:
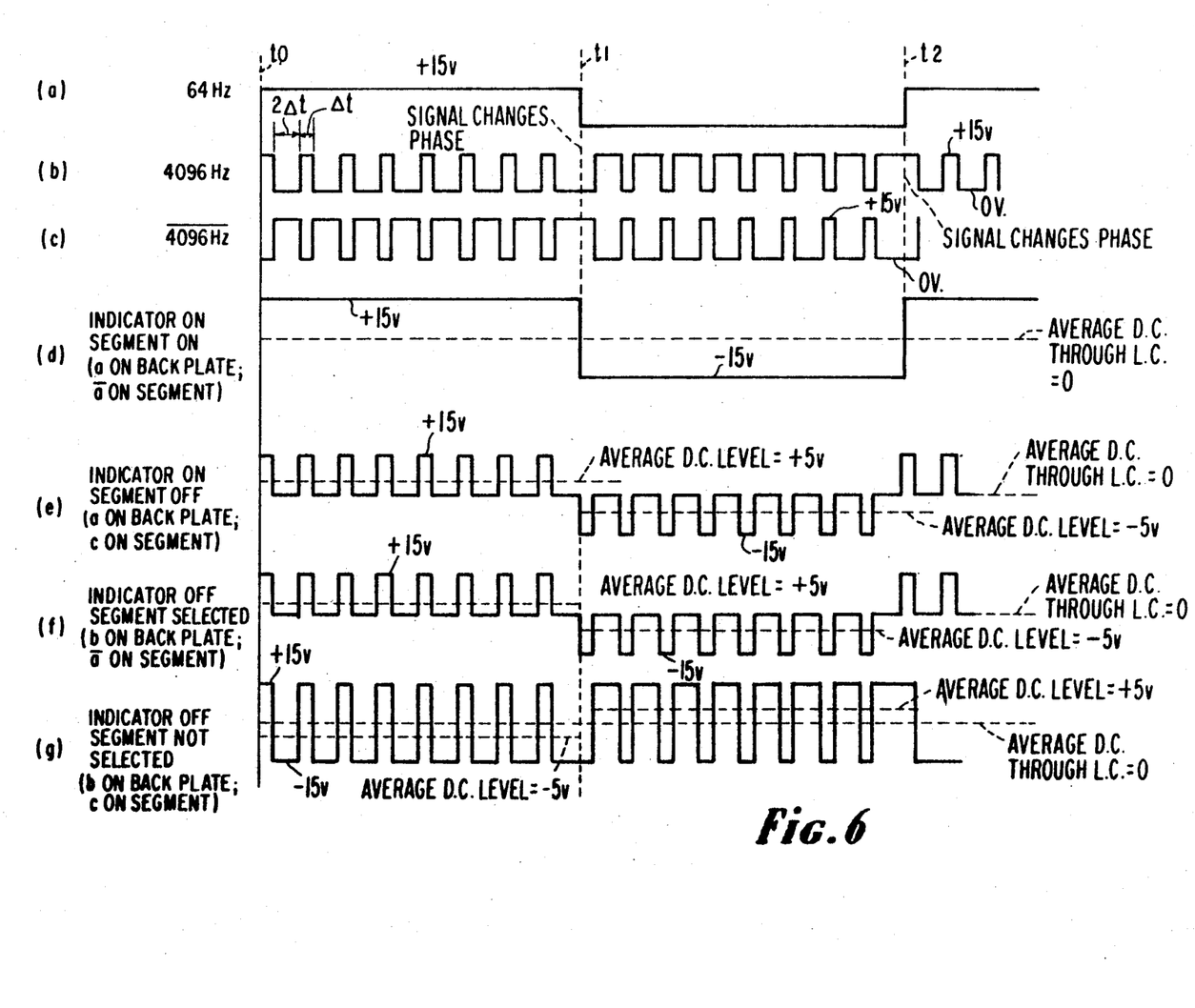

Note also that the waves $b$ and $c$, which are unipolarity alternating waves, are asymmetrical. During the period from $t_0$ to $t_1$, for example, the positive-going portion (0 to +15 volts) of wave $b$ has a duration $\Delta t$ and the negative-going portion (+15 to 0 volts) has a duration $2\Delta t$; during the period $t_1$-$t_2$ the reverse is true, that is, the positive going portion of the wave at $b$ has a duration $2\Delta t$ and the negative going portion a duration $\Delta t$. The wave $a$, on the other hand, is symmetrical and is also a unipolarity alternating voltage. The reasons for all of this will be given shortly.

FIG. 4 shows how the waves $a$, $\overline{a}$, $b$ and $c$ may be obtained. The circuit is simple and need include only two EXCLUSIVE OR gates 60 and 62. Each gate receives at one input terminal an asymmetrical 4,096 Hz signal. One third of each period is of one sense (positive-going) and the other two thirds of opposite sense (relatively negative-going). Gate 60 receives a 64 Hz exciting signal at its second terminal and gate 62 receives the complement of this exciting signal at its second input terminal. The logical inversion is obtained by means of inverter 70.

In the operation of the circuit of FIG. 4, when the 64 Hz signal is 15 volts, representing a 1 (as in the period $t_0$-$t_1$ of FIG. 6, for example), gate 60 produces an output 4,096 Hz signal complementary to the 4,096 Hz input signal to gate 60 and when the 64 Hz signal is at zero volts, representing a 0 (as in the period $t_1$-$t_2$ of FIG. 6, for example), the 4,096 Hz signal produced by gate 60 is of the same shape as the 4,096 Hz input signal to gate 60. The wave $c$ produced at the output terminal of gate 60 is shown at $c$ in FIG. 6 where it can be seen that each half cycle of the 64 Hz signal, the 4,096 Hz wave $c$ changes from one form to its complementary form. Gate 62 operates in exactly the same way; however, in view of the inversion at 70, the wave $b$ is complementary to the wave $c$ as can be seen in FIG. 6 at $b$ and $c$. There are a number of alternatives possible for FIG. 4. For example, gate 62 may be eliminated and an inverter substituted in series with the output lead of gate 60 for obtaining the signal b.

The operation of the circuit of FIG. 3 may be understood by referring both to FIGS. 5 and 6. An indicator is selected when the multiple-phase voltage (one of $\phi_1 - \phi_4$ of FIG. 5) applied to the row containing that indicator has the value 1 and the remaining multiple phase voltages have the value 0. When, for example, $\phi_1$ is 1, a positive-going signal is applied to the gate electrode of transistor 20 and a relatively negative signal to the gate electrode of transistor 21. This turns the dual gate 20, 21 on. In similar fashion, this $\phi_1 = 1$ signal turns the dual transmission gate 22, 23 off. The dual gate 20, 21 conducts the 64 Hz exciting voltage to row 1. It can be shown that all other rows receive the 4,096 Hz erase signal.

To turn a segment in a selected row on, a control voltage such as $a = 1$ is applied to the block 50 for that segment. When dual transmission gate 51, 52 is turned on, dual transmission gate 53, 54 is turned off. The $\overline{64}$ Hz signal is thereupon applied through the gate 51, 52 to column A which connects to the selected segment.

To maintain a segment of a selected indicator off, a control voltage such as $a = 0$ is applied to the block 50 (50a in this example) leading to that segment. When $a = 0$, the dual transmission gate 51, 52 is off and the dual transmission gate 53, 54 is on so that the erase signal $\overline{4,096\ Hz}$ is applied through the gate 53, 54 to the column leading to the non-selected segment of the selected indicator.

Any liquid crystal element in the display matrix of FIG. 3 may be in only one of four different conditions. If the segment is part of an indicator that has been selected, it will receive on the backplate of the indicator a 64 Hz signal and on the segment either a $\overline{64\ Hz}$ signal or a $\overline{4,096\ Hz}$ signal. If an indicator is not selected, it will receive on its backplate a 4,096 Hz signal and on its segment either a $\overline{64\ Hz}$ signal or a $\overline{4,096\ Hz}$ signal.

FIG. 6d illustrates the first condition above, that is, a selected indicator and a selected segment. Here, the 64 Hz exciting signal is applied to the backplate and the $\overline{64\ Hz}$ exciting signal is applied to the segment. The result is push-pull operation with the voltage across the liquid crystal varying from +15 volts to −15 volts. Dynamic scattering results and the segment becomes visible. Note that the average DC current through the crystal is zero.

FIG. 6e illustrates the voltage across the liquid crystal when the indicator has been selected (64 Hz applied to the backplate) but the segment is off ($\overline{4,096\ Hz}$ applied to the segment). During one-half cycle of the 64 Hz signal, the voltage across the liquid crystal varies from zero to +15 volts. However, the wave shape is such that for two-thirds of the time the voltage across the liquid crystal is zero volts and for one-third of the time the voltage across the liquid crystal is +15 volts. Thus, the average direct voltage level across the liquid crystal during the period $t_0$ to $t_1$ is only +5 volts. This is only one-third of the maximum voltage +15 volts of the unipolarity alternating voltage.

In similar fashion, it can be seen that the direct voltage level across the liquid crystal during the half period $t_1$ to $t_2$ of the 64 Hz exciting signal is only −5 volts. Note here that at time $t_1$ the wave c ($\overline{4,096\ Hz}$) changes to a form complementary to that present during the period $t_0$-$t_1$ so that when effectively added to the wave a the average level is V/3 = −5 volts and not 2V/3 or −10 volts. In other words, during the period $t_1$-$t_2$ for two-thirds of the time the voltage across the liquid crystal is zero and for one-third of the time it is −15 volts to give an average value of −5 volts, as shown in FIG. 6e. Again, this is only one-third the maximum value of the unipolarity alternating voltage. The important advantage of the present arrangement over the previous arrangement of the copending application noted above is this reduction in DC level during the half period of the exciting voltage. In the previous arrangement, the DC level during one half period of the exciting voltage was one-half the maximum voltage of the unipolarity exciting or erase voltage (V/2 or 7 ½ volts for the value of V = 15 volts given) and the threshold for dynamic scattering for the liquid crystal was somewhat higher than 7 ½ volts. Thus, in the present arrangement when the liquid crystal is in its erased condition, it is operating substantially lower than the voltage at which light scattering occurs during each half cycle of the exciting voltage than did the previous arrangement.

The above is an important operating advantage. It is desirable to be able to operate the liquid crystal indicators at a relatively high voltage to achieve maximum contrast between the on and off condition of the segments. However, due to variation in the threshold characteristics of the various indicators and due to the roundness or the lack of steepness in some cases of these characteristics, different indicator units will have somewhat differing thresholds where light scattering occurs. In the arrangement described in the previous application, a problem may occur at a given exciting voltage if one of the indicator units intended to be in an erased condition has a relatively low threshold characteristic. The direct voltage level V/2 may in this case cause this unit or certain segments of the unit faintly to scatter light. Similarly, supply voltage variations superimposed on a V/2 level may cause undesired operation of lower threshold units. With the present arrangement, as the direct voltage level across a non-selected segment during a half period of the exciting voltage is only V/3 rather than V/2, there is greater tolerance to differences in threshold levels of indicator units and to supply voltage variations.

In the present arrangement, as in the previous arrangement, the average direct current through the liquid crystal over each period of the alternating exciting voltage is zero. This is clearly shown in FIG. 6e. Thus, the present arrangement retains this advantageous feature.

FIG. 6f illustrates the case where the indicator is off (a 4,096 Hz exciting voltage applied to the backplate, that is, to a particular row in the matrix of FIG. 3) but the column connected to the segment is receiving a $\overline{64\ Hz}$ exciting voltage. Detailed analysis will show that the voltage obtained is exactly the same as that obtained in the case just discussed. The reader can satisfy himself that this is the case by graphically adding the waves b and $\overline{a}$ (the latter is complementary to a).

FIG. 6g illustrates the last possible case. Here the indicator is not selected, that is, the backplate is receiving the 4,096 erase voltage and the column conductor connected to the segment is receiving the complementary $\overline{4,096\ Hz}$ signal. In view of the asymmetrical nature of the erase voltage, during the period $t_0$ to $t_1$ of the 64 Hz exciting wave the average direct voltage level across the liquid crystal is −5 volts. If not compensated for, this would result in lessening of the life of the liquid crystal. However, as can be seen in FIG. 6g, during the immediately following half period $t_1$ to $t_2$ of the exciting wave, the average DC level across the liquid crystal is +5 volts. Therefore, averaged out over each period of the exciting wave, the average direct current through the liquid crystal is zero.

In the overall operation of the system described above, the four indicators shown are operated in multiplexed fashion, that is, one indicator is turned on at a time. The turn on period (the time the liquid crystal is in its light scattering state) should be sufficiently long and the interval between turn on periods sufficiently short that flicker is minimized. While for purposes of illustration particular values of exciting and erase voltage frequencies and amplitudes are given, it is to be understood that these are examples only. With respect to frequencies, the exciting voltage may be over 100 Hz and the erase voltage lower or higher than 4,096 Hz. As a matter of fact, as is now well understood in the art, if the liquid crystal is made sufficiently resistive, the frequency at which erasure begins can be brought down very considerably into the hundreds of Hz region, or less. With respect to amplitudes, the values chosen will depend upon such parameters as the spacing between electrodes, the liquid crystal resistivity and so on. In one particular design in which the spacing between electrodes was about 0.5 milli inch and the liquid crystal resistivity about $2.5 \times 10^8$ ohm centimeters, erase and exciting voltage amplitudes of the square waves employed were in the range of between about 13 and 18 volts.

The arrangement of the present invention has the advantage of the copending application that the number of output leads from the indicator panel of FIG. 1 is reduced. Note that there are a total of 28 segments and four backplates and these are arranged in such a way (shown in FIG. 3) that only 11 leads for the entire panel (seven columns and four rows) are needed.

While for purposes of illustration, the invention is shown to be operated with one cycle of the 64 Hz signal per character select interval (the interval of the positive-going part of a wave such as $\phi_1$) the invention is not restricted to this mode of operation. For example, the timing may be such that two or more cycles of the exciting voltage appear during each indicator selection interval. The exciting and erase voltages, while shown to be of rectangular shape (steep sides, flat top) can instead by unipolarity alternating voltages of other shapes. Similarly, other voltage values such as 0 and −15 volts can be used instead of 0 and +15 volts.

While for purposes of illustration the asymmetrical erase wave is shown to be divided into one-third of a period of one sense and two-thirds of a period of relatively opposite sense, other proportions may be employed instead. The greater the asymmetry the lower the average direct voltage level during the operation depicted in FIGS. 6e and 6f. However, the greater the asymmetry, the greater the average DC level during each half period of the exciting wave, in the liquid crystal operating as shown in FIG. 6g. Care must be taken that this DC level does not approach too closely the threshold for dynamic scattering of the liquid crystal. The choice illustrated (one-third of one sense and two-thirds period of opposite sense) appears to be optimum or close to it in the sense that during all erased conditions of the liquid crystal (FIGS. 6e, 6f and 6g) the direct current component across the liquid crystal never exceeds 1/3 V.

In some of the claims which follow, the liquid crystal elements are stated to be a matrix of such elements arranged in columns and rows. It is to be appreciated that this is not intended to be limited to a physical arrangement of elements in columns and rows and in fact, as is clear from the drawing, in the particular embodiment of the invention illustrated the segments are not physically arranged in columns and rows. The meaning intended is that the liquid crystal elements are electrically interconnected in a matrix type arrangement. It is also clear that while a panel having four numeric indicators is shown, the invention may be practiced with two, three or a number greater than four of such indicators.

What is claimed is:
1. in combination:
   a liquid crystal element having first and second optical states;
   means for selecting said element during one time period comprising means for applying a relatively low frequency alternating exciting voltage across said element during said time period for placing said element in its first optical state; and
   means for placing said element in its second optical state comprising means for applying to said element during one portion of another time period a relatively high-frequency, unipolarity voltage in a sense to produce an average first direct-voltage level less than one-half the amplitude of the high frequency unipolarity voltage and of one polarity across said element and for applying to the element during a following portion of that other time period a relatively high-frequency, unipolarity voltage in a sense and amplitude to produce an average second direct-voltage level of substantially the same value and opposite polarity to the first voltage level across the liquid crystal for producing and average direct voltage level across the element for the two portions of said other time period which is substantially zero.

2. In the combination as set forth in claim 1, the last-named said means comprising means for producing direct voltage levels across said liquid crystal element whose value does not exceed the voltage threshold for light scattering for the liquid crystal element.

3. In the combination as set forth in claim 1, said first-named means comprising means for producing a symmetrical square wave and said second-named means including means for producing an asymmetrical square wave.

4. A method for maintaining a two terminal liquid crystal element having first and second optical states in the first of said states comprising, in combination;
   applying to one of said terminals a relatively low-frequency, unipolarity alternating voltage having equal interval positive-going and negative-going excursions; and
   applying to the other of said terminals a relatively high-frequency, unipolarity alternating voltage having substantially unequal positive-going and negative-going excursion intervals, in a frequency range above that at which said liquid crystal switches to its second optical state, and which voltage switches from a first alternating waveform to a second alternating waveform complementary to said first alternating waveform each half period of said low frequency voltage, and at an amplitude level such that the direct current component across the liquid crystal is lower than the voltage threshold level for light scattering from the liquid crystal and is substantially lower in amplitude than one half the maximum amplitude of the high-frequency unipolarity alternating voltage.

5. The method as set forth in claim 4 wherein the relatively low and relatively high frequency voltages applied to the respective terminals are rectangular-wave signals.

6. In combination
a matrix of liquid crystal elements arranged in columns and rows;
means for applying to a selected row of the matrix a unipolarity alternating voltage in a frequency range at which excitation of the elements occurs;
means for applying to selected columns of the matrix a unipolarity alternating voltage at the same frequency as the voltage applied to said selected row and which is substantially 180° out-of-phase with the voltage at said selected row;
means for applying to the remaining columns of the matrix a relatively high-frequency unipolarity alternating voltage in a frequency range above that at which excitation of said liquid crystal occurs and which changes to its complementary form each half period of the unipolarity exciting voltage; and
means for applying to the remaining rows of the matrix a voltage 180° out-of-phase with said relatively high frequency unipolarity alternating voltage.

7. In the combination as set forth in claim 6, each row of said matrix comprising a numeric indicator having a backplate, a number of segments equal to the number of columns of the matrix and liquid crystal located between the backplate on the one hand and the segments on the other hand, said backplate serving as the row, and each segment being connected to a different column.

8. In the combination as set forth in claim 6, said means for applying a relatively high frequency unipolarity alternating voltage comprising means for applying an asymmetrical square wave.

9. In the combination as set forth in claim 8, said means for applying a relatively high frequency unipolarity alternating voltage comprising means for applying a wave which is of one sense during one third of each period of said wave and of opposite sense during the remaining two thirds of each period of said wave.

10. In combination:
a matrix of liquid crystal elements arranged in columns and rows;
means for selecting one of said elements in said matrix comprising means for applying a relatively low frequency alternating exciting voltage to the column in which said element is located and means for applying an alternating exciting voltage of the same frequency and 180° out of phase with the voltage applied to said column to the row in which said element is located, for causing said one element to assume one optical state; and
means for concurrently placing a second element in the same row of said array in a second optical state comprising means for applying to the column in which said second element is located a relatively high-frequency, unipolarity voltage in a sense to develop across said second element an average first direct-voltage level less than one-half the amplitude of the high frequency unipolarity voltage and of one polarity during one portion of the period of said exciting voltage and for applying to said second element during the remaining portion of the period of said exciting voltage a relatively high-frequency, unipolarity voltage in a sense and amplitude to produce an average second direct-voltage level of substantially the same value and opposite polarity to the first voltage level across the liquid crystal, to thereby producing an average direct voltage level across the element for the two portions of said period of said exciting voltage which is substantially zero.

11. In the combination as set forth in claim 10, said means for selecting one of said elements comprising means for producing symmetrical square waves of opposite phase, and said means for concurrently placing said second element in a second optical state comprising means for producing an asymmetrical square wave of one form during one half period of said symmetrical square wave and of complementary form during the other half period of said symmetrical square wave.

12. In the combination as set forth in claim 11, said means for concurrently placing said second element in a second optical state comprising means for producing an asymmetrical square wave having one-third of its period of one sense and the remaining two-thirds of its period of opposite sense and which changes its phase during each half period of one of said symmetrical square wave exciting voltages.

13. In the combination as set forth in claim 10, further including:
means for selecting other elements in the same row as said one element comprising means for applying to the columns in which said other elements are located an alternating exciting voltage of the same frequency of and in phase with the voltage applied to the column in which said one element is located;
means for applying to all remaining rows of said matrix a voltage of the same amplitude as and 180° out of phase with that applied to the column in which said second element is located; and
means for applying to all columns of the matrix not receiving an exciting voltage, a voltage of the same amplitude as and in phase with that applied to the column containing said second element.

14. In combination:
a matrix of liquid crystal elements arranged in columns and rows;
means for applying to a selected row of the matrix a unipolarity alternating voltage in a frequency range at which excitation of the elements can be achieved;
means for applying to selected columns of the matrix a unipolarity alternating voltage at the same frequency as the voltage applied to said selected row and which is substantially 180° out of phase with the voltage at said selected row;
means for applying to the remaining columns of the matrix a relatively high frequency unipolarity alternating voltage in a frequency range above that at which excitation occurs and which is of one form during alternate half periods of the unipolarity and of complementary form during the remaining half periods of said unipolarity alternating exciting voltage; and means for applying to the remaining rows of the matrix a voltage 180° out of phase with said relatively high frequency unipolarity alternating voltage and at an amplitude level such that the direct current component across the liquid crystal elements in said remaining rows of the matrix and in said remaining columns of the matrix is lower than the voltage for excitation of the liquid crystal and is substantially lower in amplitude than one-half the maximum amplitude of the high-frequency unipolarity alternating voltage.

15. In the combination as set forth in claim 14, each row of said matrix comprising a numeric indicator having a backplate, a number of segments equal to the number of columns of the matrix, and liquid crystal located between the backplate on the one hand and the segments on the other hand, said backplate serving as the row, and each segment being connected to a different column.

16. In the combination as set forth in claim 14, said means for applying said relatively high frequency unipolarity alternating voltage comprising means for applying an asymmetrical square wave.

17. In the combination as set forth in claim 16, said means for applying a relatively high frequency unipolarity alternating voltage comprising means for applying a wave which is of one sense during one-third of each period of said wave and of opposite sense during the remaining two-thirds of each period of said wave.

* * * * *